US007953073B2

(12) United States Patent
Hassbjer et al.

(10) Patent No.: US 7,953,073 B2
(45) Date of Patent: May 31, 2011

(54) COMMUNICATIONS MODULE INTERFACE

(75) Inventors: Nicolas Hassbjer, Halmstad (SE);
Johan Häggström, Halmstad (SE);
Joakim Wiberg, Halmstad (SE)

(73) Assignee: HMS Industrial Networks AB, Halmstad (SE)

( * ) Notice: Subject to any disclaimer, the term of this patent is extended or adjusted under 35 U.S.C. 154(b) by 873 days.

(21) Appl. No.: 11/629,473

(22) PCT Filed: Jun. 14, 2005

(86) PCT No.: PCT/SE2005/000905
§ 371 (c)(1),
(2), (4) Date: Nov. 8, 2007

(87) PCT Pub. No.: WO2005/124569
PCT Pub. Date: Dec. 29, 2005

(65) Prior Publication Data
US 2008/0168196 A1 Jul. 10, 2008

(30) Foreign Application Priority Data

Jun. 15, 2004 (SE) ...................................... 0401531

(51) Int. Cl.
*H04L 12/50* (2006.01)
(52) U.S. Cl. ........................ 370/358; 370/366; 710/62
(58) Field of Classification Search ........................ None
See application file for complete search history.

(56) References Cited

U.S. PATENT DOCUMENTS

| 4,972,470 | A | 11/1990 | Farago |
| 5,548,782 | A | 8/1996 | Michael et al. |
| 6,334,160 | B1 | 12/2001 | Emmert et al. |
| 6,434,648 | B1 * | 8/2002 | Assour et al. ................. 710/305 |
| 6,791,483 | B2 * | 9/2004 | Hattori .......................... 341/101 |
| 7,159,055 | B2 * | 1/2007 | Chiang et al. .................... 710/74 |
| 2003/0005192 | A1 | 1/2003 | Swope et al. |
| 2003/0074515 | A1 * | 4/2003 | Resnick ........................ 710/313 |
| 2003/0081666 | A1 * | 5/2003 | Nah .............................. 375/222 |
| 2004/0006654 | A1 | 1/2004 | Bando |

FOREIGN PATENT DOCUMENTS

| EP | 0589743 A1 | 3/1994 |
| WO | WO 9731386 A1 | 8/1997 |

* cited by examiner

*Primary Examiner* — Chirag G Shah
*Assistant Examiner* — Minh-Trang Nguyen
(74) *Attorney, Agent, or Firm* — Harness, Dickey & Pierce, P.L.C.

(57) ABSTRACT

A communications module including an electrical interface for operatively connecting the communications module to an electric device is disclosed. The electric interface enables data communication between the communications module and the electric device in either a serial mode or parallel mode. The communications module includes: one or more electrical connectors arranged in the electric interface, a Dual Port RAM is connected to the electrical interface for providing parallel transfer of data through the electrical interface, and a control unit connected to at least one of the one or more electrical connectors, wherein the control unit is adapted to determine the value of one or more signals applied on the at least one of the one or more electrical connectors and enable either serial or parallel data communication through the electrical interface depending on the value of the one or more signals.

19 Claims, 4 Drawing Sheets

COMMUNICATIONS MODULE INTERFACE

TECHNICAL FIELD

The present invention generally relates to data communication, and more specifically to a communications module comprising an interface which enables communication in either a serial mode or a parallel mode.

TECHNICAL BACKGROUND

Field bus systems are frequently used in the industry for enabling communication between different units in control systems. Various types of field buses have been developed by different companies and organizations all over the world. The term field bus covers many different industrial network protocols. Generally, industrial field buses may be sub-divided into different categories depending on the capabilities they offer. The simplest field bus protocols are designed primarily for an on/off interface used for e.g. valves, proximity sensors, and limit switches, while more complex field bus protocols offer handling of large amounts of data as when a computer communicates with a PLC (Programmable Logic Controller). Examples of filed buses of different complexity used today are CONTROLNET, PROFIBUS, DEVICENET, CANBUS, and LONWORKS.

When connecting e.g. a PLC to a specific field bus, the manufacturer of the PLC must provide an interface to the filed bus in order to enable reception and transmission of data via the field bus network. Since the number of available field bus protocols is extensive, and most of the protocols are not compatible, neither from a physical nor a communicative point of view, it is expensive and cumbersome to provide e.g. PLCs for each and every possible filed bus system.

One solution to the problem above is to provide a communications module, which acts as an interfaces between the PLC and the field bus network. The interface between the communications module and the PLC may hence be fixed and standardized while the interface towards the filed bus network may vary from module to module.

However, devices, such as the PLC, which are to be connected to the field bus network via the communications module are, depending on their design, best suited for communication in either a serial or parallel mode. For example, in a device that transfers large amounts of data a parallel interface may be the most efficient due to the reduced load on the communications circuitry as regards processing speed in the device. Other special design parameters, such as cost or size of the device may require a device to communicate in either a serial or parallel mode.

For optimizing the performance of a communications module which is to act as an interface between the device and a field bus system, the communications module should be able to communicate in both serial and parallel mode towards the device. However, problems arise as to the set-up of communications module when it is connected to the device, i.e. should the communications module communicate via a parallel or serial interface, and if serial mode is best suited for communication, what baud rate should be used for the data transfer?

Consequently, there is a need for an interface between the device and the communications module that enables the communications module to fast and unfailingly determine which communication mode to operate in.

SUMMARY OF THE INVENTION

An object of the present invention is to overcome the above described problems of the known technologies in regards to determining which communication mode to operate in. A particular advantage of the present invention is a robust method and apparatus for determining which communications mode to operate in. A further advantage of the invention is the possibility fast and reliably detect the desired communications mode to operate in.

A particular feature of the present invention relates to the provision of a one or more pins in a connector, which pins are dedicated for indicating which communications mode to operate in.

The above objects, advantages and features together with numerous other objects, advantages and features, which will become evident from the detailed description below, are obtained according to a first aspect of the present invention by a communications module comprising an electrical interface for operatively connecting the communications module to an electric device, wherein the electric interface enables data communication between the communications module and the electric device in either a serial mode or parallel mode, said communications module comprising:

one or more electrical connectors arranged in the electric interface, a control unit connected to at least one of the one or more electrical connectors, wherein the control unit is adapted to determine the value of one or more signals applied on the at least one of the one or more electrical connectors and enable either serial or parallel data communication through the electrical interface depending on the value of the one or more signals.

The communications module may use at least one of the one or more electrical connectors solely for providing the one or more signals to the control unit The communications module may comprise a control unit which is adapted to determine the value of one or more digital signals of either a static logical low level or a static logical high level provided on the at least one of the one or more electrical connectors.

The communications module may comprise a control unit which is connected to two or more electrical connectors arranged in the electrical interface, and adapted to determine the values of the signals applied on the two or more electrical connectors and to vary the bit rate of an enabled serial communication through the interface depending on the value of the signals.

The communications module may comprise a Dual Port RAM which is connected to the electrical interface for providing parallel transfer of data through the electrical interface.

The communications module may comprise network circuitry for providing transfer of data from the Dual Port RAM on to a network.

The above objects, advantages and features together with numerous other objects, advantages and features, which will become evident from the detailed description below, are obtained according to a second aspect of the present invention by a method for enabling data communication between a communications module and an electric device in either a serial mode or parallel mode via an electrical interface comprising one or more electrical connectors, said method comprising:

determining the value of one or more signals applied on at least one of the one or more electrical connectors arranged in the electrical interface, and enabling serial or parallel data communication between the communications module and the electric device through the electrical interface depending on the value of the one or more signals.

The method may utilize that at least one of the one or more electrical connectors are used solely for providing the one or more signals to the control unit.

The method may utilize that one or more signals provided on the at least one of the one or more electrical connectors are digital signals of either a static logical low level or a static logical high level.

The method may comprise determining the values of signals applied on two or more electrical connectors and to vary the bit rate of an enabled serial communication through the interface depending on the value of the signals.

BRIEF DESCRIPTION OF THE DRAWINGS

Further objects, features and advantages of the present invention will become apparent upon consideration of the following detailed description in conjunction with the appended drawings.

DETAILED DESCRIPTION OF PREFERRED EMBODIMENTS

A communications module in which the present invention may be applied will first be described with reference to FIG. 1. Then, the particulars of the communications module according to the invention will be described with reference to the remaining FIGs.

Figure 1:
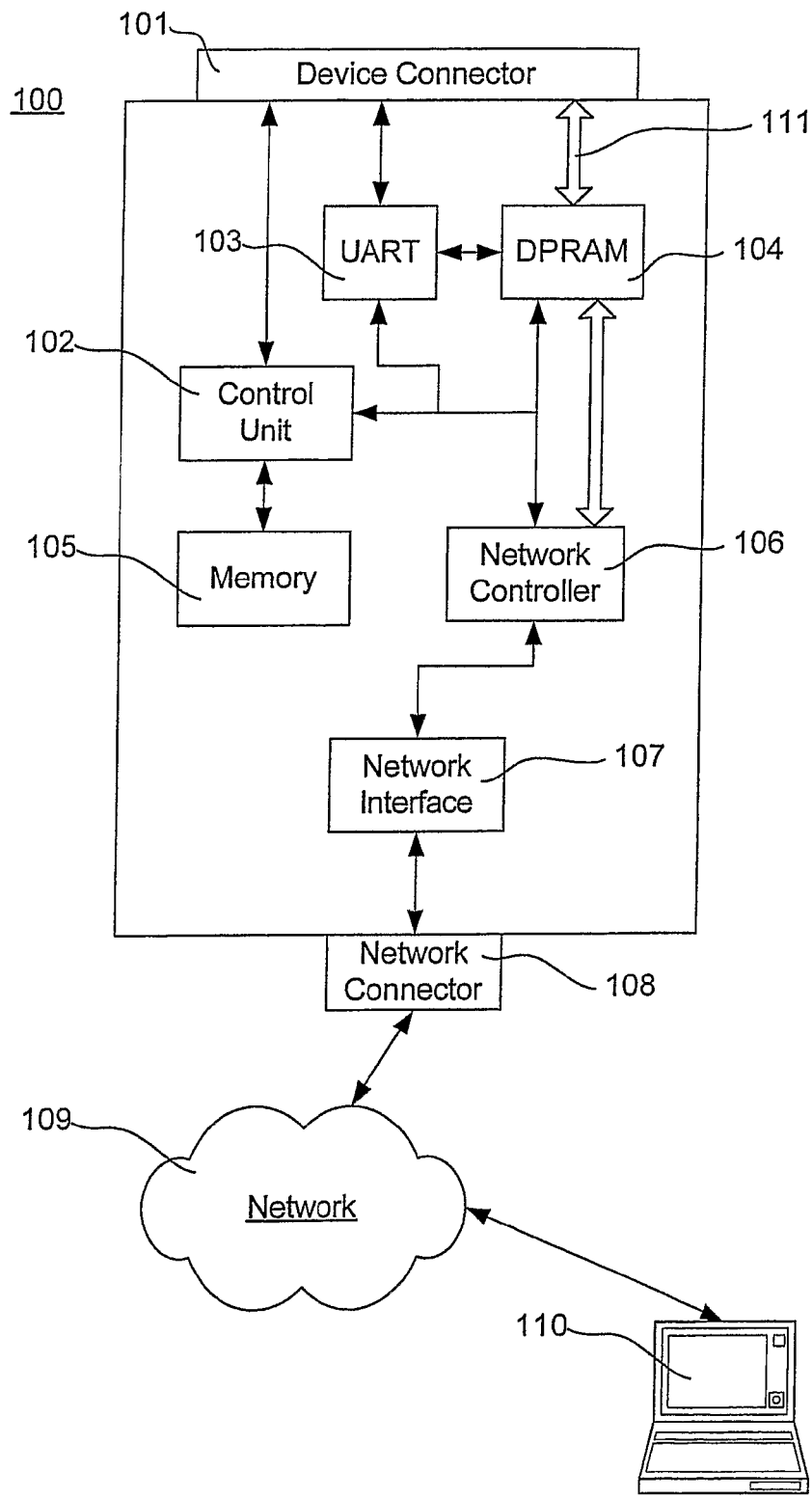
FIG. 1 is a schematic illustration of a communications module, in which the present invention may be applied.

FIG. 1 schematically illustrates a communications module 100 according to a preferred embodiment of the present invention. The communications module 100 comprises an electrical interface 101 in the form of a device connector for connecting the communications module to a device (not shown). The electrical connection between electric circuitry in the communications module 100 and electric circuitry in the device is established in the electrical interface 101 by means of electrical connectors, which preferably are in the form of male-female pins and sockets.

In the communications module 100, the electrical interface 101 is connected to a control unit 102, a UART (Universal Asynchronous Receiver-Transmitter) 103, and a DPRAM (Dual Port Random Access Memory) 104. The electrical interface 101 may also be connected to other circuit elements in the communications module (not shown) such as power supply circuitry in case the communications module is powered from the device, interrupt circuitry, GPIO (General Purpose Input/Output) circuitry, etc.

The control unit 102 is preferably in form of a micro processor and connected to a memory 105 which is used for storing program code for controlling the behavior of the communications module 100 (sometimes referred to as firmware). The control unit 102 may however also be in the form of an FPGA (Field Programmable Gate Array), an ASIC (Application-Specific Integrated Circuit) or any other suitable hardware. In case the control unit 102 is in the form of e.g. an FPGA, the memory 105 may not be needed since the FPGA then inherently may comprise the control program.

As will be disclosed in more detail below, the control unit 102 is preferably also connected to the UART 103, the DPRAM, and a network controller 106 for being able to control the behavior of the different units 103-106. It is however appreciated that the communication between the different units 103-106 may be performed without interference from the control unit 102.

The UART 103 transmits serial data to and receives serial data from the device via the electrical interface 101 according to techniques known per se. The UART 103 comprises one or more registers for buffering data that is to be transmitted or data that have been received. The UART 103 may as well comprise a multi-byte FIFO (First In First Out) buffer for rendering the transmission of data more effective. Additionally the UART 103 also comprises protecting circuitry for minimizing the risks of damaging the communication circuitry due to e.g. static discharge when connecting the communications module 100 to the device. The UART 103 is also connected to the DPRAM 104 for being able to transfer data from the device to the DPRAM 104 and vice versa. The skilled person realizes that the UART 103 may be implemented in hardware as a stand alone unit, such as the industry standard 16C550, which is then connected to the control unit 102. The UART 103 may alternatively be part of an embedded microcontroller, such as the AT90LS8535 from ATMEL Corporation, 2325 Orchard Parkway, San Jose, Calif. 95131, USA. Moreover, the UART 103 may as a further alternative be implemented as a code portion which is stored in the memory 105 and which performs a UART algorithm when executed in the control unit 102.

The DPRAM 104 is besides being connected to the UART 103, also connected to the electrical interface 101 via an 8-bit data bus 111. However, it is appreciated in this context that the width of the data bus 111 may as well be 16 bits, 32 bits, 64 bits, or any other suitable number of bits, depending on the amount of data that need to be transferred between the device and the communications module 100. In order to direct the data on the data bus 111a, the DPRAM 104 is also connected to the electrical interface 101 via an address bus 111b. The width of the data bus depends on the size of the DPRAM 104, i.e. for being able to address a 16 k memory area in the DPRAM 104, the address bus 111b must be 14 bits wide.

Moreover, the DPRAM 104 is connected to the network controller 106 for enabling transmission of data from the DPRAM 104 to other nodes 110 on a network 109 connected to the communications module 100. Correspondingly, the DPRAM 104 may receive data from other nodes 110 on the network 109. Data from the DPRAM 104 are transferred via the network controller 106, a network interface 107, and a network connector 108 on to the network, whereupon the data are sent to the designated node 109 according to techniques known per se.

As mentioned above, the network controller 106, the network interface 107, and the network connector 108 are preferably designed for operation in accordance with one specific network standard. Hence the network controller 106 adapts the data received from the DPRAM 104 in accordance with the specified field bus protocol. More specifically, in case PROFIBUS is used as actual field bus protocol, the information transferred over the network will in addition to the data provided by the device also comprise a source address, a destination address, a 16-bit CRC (Cyclic Redundancy Check) value, as well as other PROFIBUS-specific data. The other node 110 corresponding to the destination address in the network will upon reception of a message strip the message from protocol-specific data and use the data provided from the device.

Figure 2:
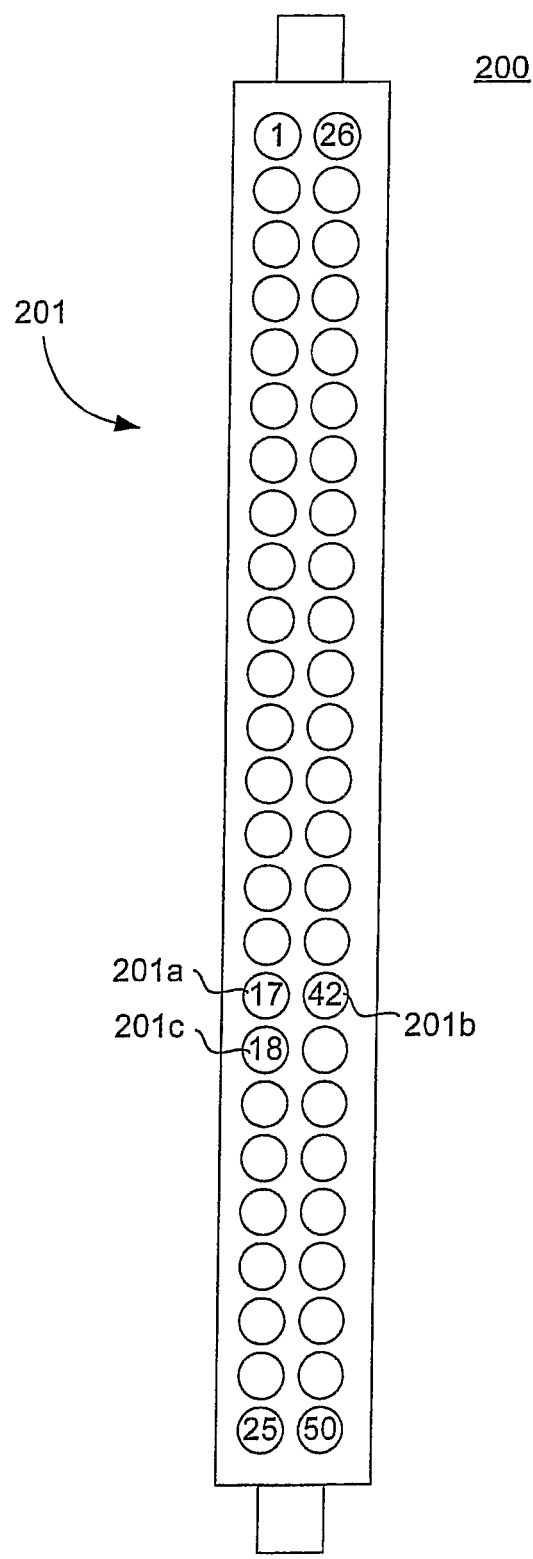
FIG. 2 is a schematic diagram illustrating the connector used by the communications module to interface the device.

FIG. 2 illustrates a connector 200 for connecting the communications module 100 to the device. The connector 200 is preferably in the form of a 50-pin compact flash connector, but any suitable connector may be used, such as a D-Sub connector (normally used for attaching modems or the like to a computer), a Centronics connector, a HD (High Density) connector (normally used in SCSI-II), a VHDCI (Very High Density Cable Interconnect) connector, an RD (regular Density) connector (normally used for IDE devices). Additionally, the actual number of contact pins 201 used in the connector is also dependent on the bus width of the data bus 111a, and the address bus 111b.

Besides connector pins for the data bus 111a and the address bus 111b, one or more pins are dedicated for enabling the communications unit 100 to determine which communications mode to operate in. In a preferred embodiment three indication pins 201a-c are used for indicating the preferred communications mode. Moreover, the indication pins 201a-c are preferably grouped in the connector 200 layout so as to provide a simple application design. However, it is equally possible to arrange any number of indication pins 201a-c at any location in the connector 200 layout depending on the desired application design and the desired number of communication modes. By providing three indication pins 201a-c it is possible to set eight different communication modes which in binary representation range from 000 to 111.

For example, if all indication pins 201a-c are set to logical zero (i.e. a low potential or current depending on the technology used for the logical circuitry) at startup (000), the communications module 100 will enter a communication mode, wherein it communicates with the device in a parallel mode. If the indication pin 201a which represents the least significant bit of the indication bits is set to logical one (001), the communications module 100 will enter a communication mode, wherein it communicates with the device in a serial mode with a baud rate of 4800 bits per second. The table below illustrates by way of example different possible communication modes which are enabled by use of the indication pins 201a-c:

| Indication pins 201c, b, a | Communication mode |
| --- | --- |
| 000 | Parallel |
| 001 | Serial 4.8 kb/s |
| 010 | Serial 9.6 kb/s |
| 011 | Serial 19.2 kb/s |
| 100 | Serial 57.6 kb/s |
| 101 | Serial 115.2 kb/s |
| 110 | Serial TBD >500 kb/s |
| 111 | Service mode |

If all indication bits are set to one (111) at startup, the communications module 100 will enter a service mode, wherein it is possible to perform a firmware download, i.e. an update of at least parts of the program code in the memory 105. It is appreciated that the table above is only an example and that other configurations, such as the provision of other baud rates and more than one service mode. Some of the combinations of the indication bits may also be reserved for future use.

Since the indication pins 201a-c are set by the device at startup to a potential corresponding to either a logical low (zero) or a logical high (one) state, a very fast and reliable detection of the desired communication mode is provided. Additionally, the detection of the desired communications mode may be done very fast by parallel reading of the indication pins 201a-c since all bits are provided in the connector and hence simultaneously achievable by the communications unit 100. Moreover, the communications module 100 does not have to decode data regarding the desired communication mode according to any specific protocol. Hence the communication mode detection functionality in the control unit 102 becomes simple to implement. In its simplest form three bits of an I/O port in the control unit 102 is dedicated for detecting the logical level on the indication pins 201a-c. An detection algorithm executed in the control unit 102 may then determine which communication mode to enter.

Figure 3A:
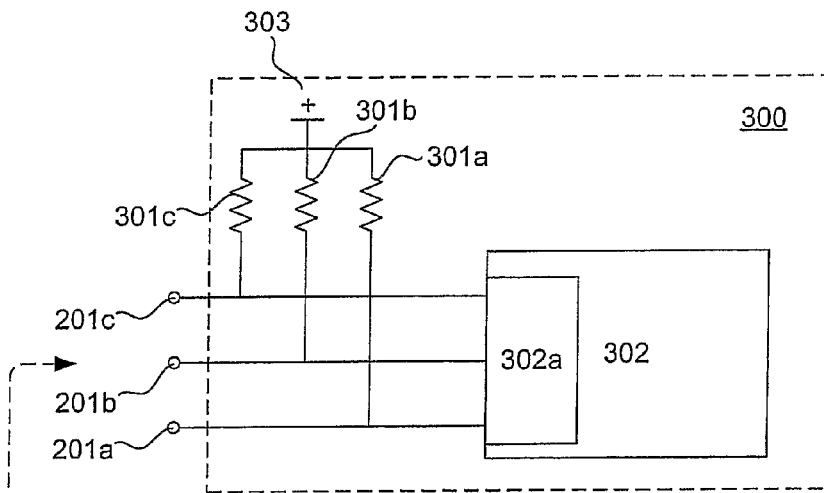
FIG. 3a-f is schematic diagrams illustrating examples of electrical connections used in the electrical interface.
Figure 3B:
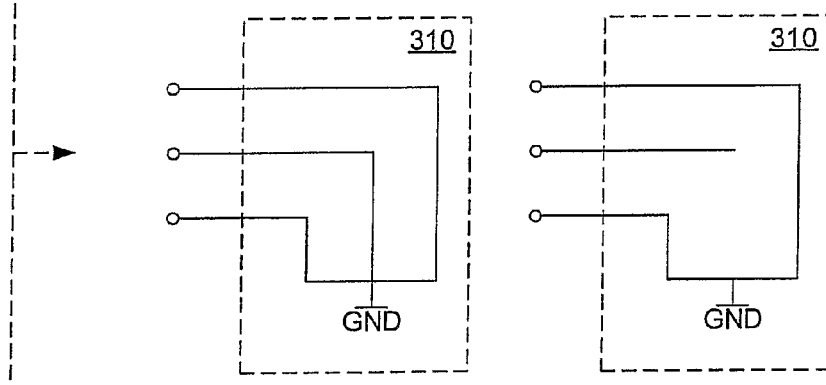
Figure 3C:
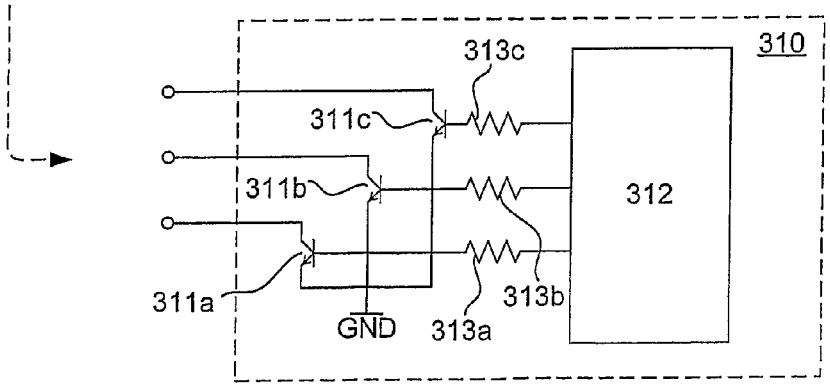

FIG. 3a-c illustrates examples of the electrical circuitry used for establishing a desired communication mode. The dashed line to the left in the figure indicates the interconnection between the communications module 300 and the device 310. The data, address, and other signal lines are left out of the figures for the sake of clarity. FIG. 3a illustrates a communications module 300 with its associated control unit 302. The control unit 302 also comprises an I/O port 302a which may be configured to receive and/or transmit data according to techniques known per se. The I/O port preferably also comprises protection circuitry (not shown) for protecting the communication circuitry in the I/O port from electrostatic discharge, which may occur when a user connects the communications module 300 to the device 310. The I/O port 302a is connected to the indication pins 201a-c for enabling the control unit 302 to determine the value of a signal applied thereon. The control unit determines the value of the signal according to well established standards, i.e. the control unit 302 may determine that the signal corresponds to a logical high state (one) if the voltage potential on the indication pin 201a-c in question exceeds a predetermined value (e.g. 70% of the power supply voltage). Likewise may the control unit determine that the signal corresponds to a logical low state (zero) if the voltage potential on the indication pin is below a predetermined value (e.g. 30% of power supply voltage). The comparison between the potential on the indication pins 201a-c and the power supply voltage may be performed by simple electrical circuitry in the form of comparators and is normally implemented as part of the control unit 102. Other forms of electrical circuitry for determining the value of the signal on the indication pins 201a-c, such as A/D converters may as well be used.

The logical levels on the indication pins 201a-c are normally kept high by means to the pull-up resistors 301a-c. The pull-up resistors set the potential on the indication pins 201a-c to substantially the same potential as the power supply voltage 303 which preferably is 3.3 volt, but may as well be 5 volt, 12 volt, 24 volt or any other potential depending on the technology used in the logical circuitry are equally possible within the scope of the invention.

FIG. 3b illustrates two examples of hardware coding arranged in the device 310 for setting the communication mode in the communications device 300. When the device 310 is connected to the communications module 300, the arrangement in the leftmost figure sets the potential on all the indication pins 201a-c to a logical low state due to the direct connection to ground (GND). Consequently, the control unit 302 in the communications module 300 will at startup read the static value "000" from the indication pins 201a-c. According to the table above the communications module 300 will hence communicate with the device 310 in parallel mode. In the rightmost figure, the line which is to be connected to indication pin 201b of the communications unit 300 is not connected to ground, but instead electrically free floating. Due to the pull-up resistors 301a-c in general, and the resistor 301b which is connected to the indication pin 201b in particular, the control unit 302 will at startup read the static value "101" from the indication pins 201a-c. Consequently, in accordance with the table above, the communications module 300 will communicate with the device in serial mode with a baud rate of 115.2 kb/s.

FIG. 3c illustrates an alternative to a fixed hardware coding for setting the communication mode in the communications device 300. A control unit 312 in the device is connected to a set of transistors 311a-c acting as switches. In FIG. 3c a set of NPN bipolar transistors 311a-c are used as switches. The switching function could as well be achieved by means of one or more PNP bipolar transistors, MOSFETs, IGBTs, relays, solid state switches, or any other type of components suitable for providing a switching functionality. Moreover, the transistors 311a-c could be external to the control unit 312, as illustrated in FIG. 3c, or could be integral with e.g. an I/O port of the control unit 312.

The transistors 311a-c are arranged in an open collector configuration and reachable for interconnection with the indication pins 201a-c of the communications unit 300. The emitters of the transistors 311a-c are connected to ground, while each base of the transistors 311a-c are connected to a port of the control unit 312. An application software executed in the control unit 312 may then address the port and set one or more pins of the port to a logical high level. Current will then start to flow via the resistors 313a-c and the base-emitter junction of the transistors 311a-c and hence raise the base-emitter potential of the corresponding transistor 311a-c to a level where the transistor 311a-c is turned on. When one or more of the transistors 311a-c are turned on, current will start to flow in one or more of the resistors 301a-c that are connected to the transistors 311a-c via the indication pins 201a-c. According to the well-known Ohms law, the current through the resistors will then give rise to a potential drop over the resistors, wherein the control unit 302 in the communications device will read a logical low value on the corresponding indication pin 201a-c.

The advantage of using a device 310 as shown in FIG. 3c is that the desired communications mode does not have to be established when the device 310 is manufactured, but may be subsequently established by program code segments in the application software. A switch between different communication modes are then possible if e.g. a first desired communication mode turns out to be impractical due to different factors such as transmission speed, disturbances (noise), etc.

Figure 3D:
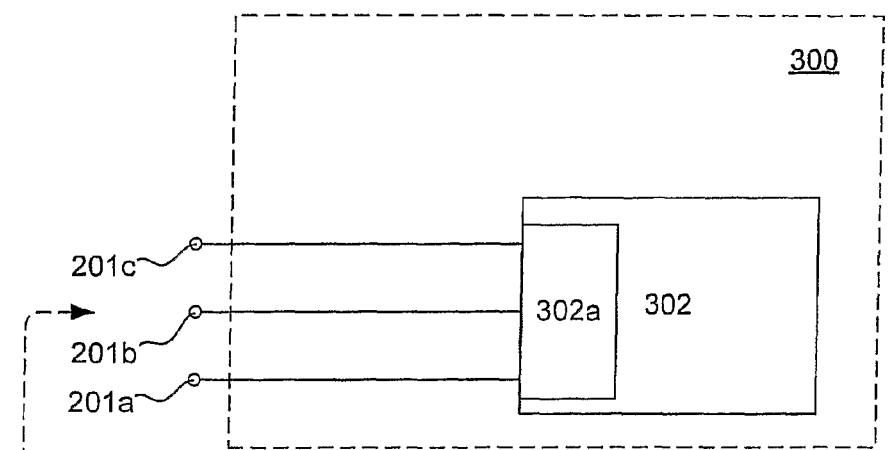
Figure 3E:
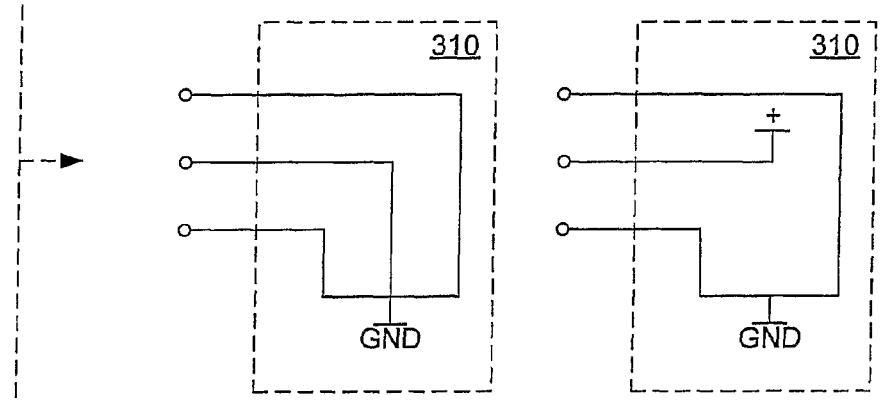
Figure 3F:
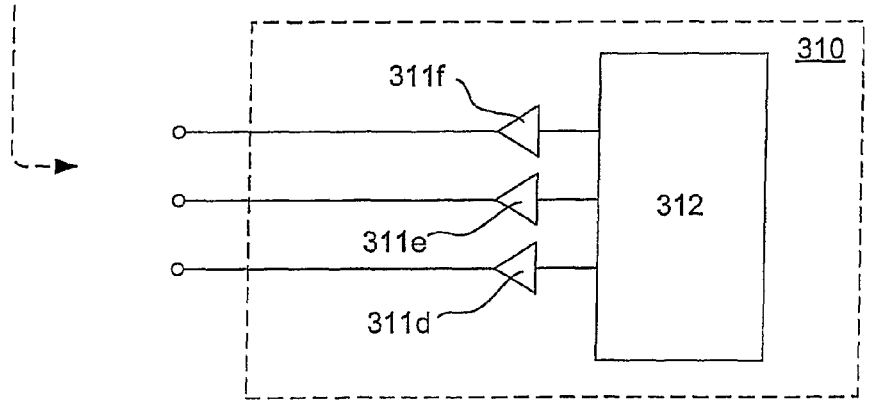

FIGS. 3d-f corresponds to FIGS. 3a-c with the exception that no pull-up resistors are used for setting the potential on the indication pins 201a-c in the communications module 101. Instead the potential on the indication pins 201a-c are set by the device by the provision of push-pull type driver circuitry 311d-f or fixed connections to either ground or the positive power supply.

While the present invention has been particularly shown and described with reference to specific embodiments thereof, it will be understood by those skilled in the art that various changes in form and detail may be made thereto, and that other embodiments of the present invention beyond embodiments specifically described herein may be made or practiced without departing from the spirit and scope of the present invention as limited solely by the appended claims.

The invention claimed is:

1. A communications module comprising:
a single electrical interface configured to operatively connect the communications module to an electric device, the electric interface being configured to communicate data in a serial mode and configured to communicate data in a parallel mode between the communications module and the electric device;
at least one electrical connector included in the single electrical interface;
a Dual Port RAM connected to the single electrical interface, the Dual Port RAM configured to parallelly transfer data through the single electrical interface; and
a control unit connected to the at least one electrical connector, the control unit configured to determine a value of at least one digital signal of the at least one electrical connector, and the control unit configured to serially communicate data and configured to parallelly communicate data through the single electrical interface depending on the determined value of the at least one signal.

2. The communications module according to claim 1, wherein the at least one electrical connector provides the at least one signal to the control unit.

3. The communications module according to claim 2, wherein the control unit is adapted to determine the value of the at least one digital signal on the at least one electrical connector as a static logical low level or a static logical high level.

4. The communications module according to claim 2, wherein the control unit is connected to at least two electrical connectors include in the single electrical interface, the control unit configured to determine values of the signals on the at least two electrical connectors and configured to vary a bit rate of an enabled serial communication through the single electrical interface depending on the value of the determined signals.

5. The communications module according to claim 2, comprising network circuitry configured to transfer data from the Dual Port RAM to a network.

6. The communications module according to claim 1, wherein the control unit is adapted to determine the value of the at least one digital signal on the at least one electrical connector as a static logical low level or a static logical high level.

7. The communications module according to claim 6, wherein the control unit is connected to at least two electrical connectors included in the single electrical interface, the control unit configured to determine values of the signals on the at least two electrical connectors and configured to vary a bit rate of an enabled serial communication through the single electrical interface depending on the value of the determined signals.

8. The communications module according to claim 6, comprising network circuitry configured to transfer data from the Dual Port RAM to a network.

9. The communications module according to claim 1, wherein the control unit is connected to at least two electrical connectors included in the single electrical interface, the control unit configured to determine values of signals on the at least two electrical connectors and configured to vary a bit rate of an enabled serial communication through the single electrical interface depending on the value of the determined signals.

10. The communications module according to claim 9, comprising network circuitry configured to transfer data from the Dual Port RAM to a network.

11. The communications module according to claim 1, comprising network circuitry configured to transfer data from the Dual Port RAM to a network.

12. A method of communicating data between a communications module and an electric device in a serial mode or parallel mode via a single electrical interface, the single electrical interface including at least one electrical connector, said method comprising:

determining a value of at least one signal on at least one connector included in the single electrical interface; and communicating data in a serial manner and communicating data in a parallel manner between the communications module and the electric device through the single electrical interface depending on the determined value of the at least one signal, the parallel data communication being via a Dual Port RAM connected to the single electrical interface.

13. The method according to claim 12, wherein the at least one electrical connector provides the at least one signal to a control unit.

14. The method according to claim 13, wherein the at least one signal on the at least one electrical connector is a static logical low level or a static logical high level digital signal.

15. The method according to claim 14, further comprising determining values of signals applied on at least two electrical connectors and varying a bit rate of an enabled serial communication through the single electrical interface depending on the determined value of the signals.

16. The method according to claim 13, further comprising determining values of signals on at least two electrical connectors and varying a bit rate of an enabled serial communication through the single electrical interface depending on the determined value of the signals.

17. The method according to claim 12, wherein the at least one signal on the at least one electrical connector is a static logical low level or a static logical high level digital signal.

18. The method according to claim 17, further comprising determining values of signals on at least two electrical connectors and varying a bit rate of an enabled serial communication through the single electrical interface depending on the determined value of the signals.

19. The method according to claim 12, further comprising determining values of signals on at least two electrical connectors and varying a bit rate of an enabled serial communication through the single electrical interface depending on the determined value of the signals.

* * * * *